United States Patent [19]
Malaspina et al.

[11] Patent Number: 5,640,071
[45] Date of Patent: Jun. 17, 1997

[54] TRANSIENT CHARGE RECOVERY CIRCUIT

[76] Inventors: Francis P. Malaspina, 5731 Harbor N., Gainesville, Ga. 30504; Simon Thomas, 265 Merritt Dr., Lawrenceville, Ga. 30504; Sathya S. Prasad, 2314 Arbor Dr., Duluth, Ga. 30136; Scott M. Garrett, 840 Stationview Run, Lawrenceville, Ga. 30136

[21] Appl. No.: 544,420

[22] Filed: Oct. 10, 1995

[51] Int. Cl.⁶ ...................................................... H02J 9/04
[52] U.S. Cl. ........................... 318/139; 318/373; 318/376
[58] Field of Search ...................................... 318/138, 139, 318/254, 245, 260–293, 370–434; 388/937, 911, 813, 815; 363/62, 60; 320/1

[56] References Cited

U.S. PATENT DOCUMENTS

| | | | |
|---|---|---|---|
| 4,454,454 | 6/1984 | Valentine | 318/293 |
| 4,677,539 | 6/1987 | Erickson et al. | 363/132 |
| 4,680,516 | 7/1987 | Guzik et al. | 318/317 |
| 4,712,853 | 12/1987 | Howard | 350/6.5 |
| 4,733,146 | 3/1988 | Hamby | 318/393 |
| 4,767,970 | 8/1988 | Rodal | 318/375 |
| 4,829,391 | 5/1989 | Vargas | 360/51 |
| 4,904,918 | 2/1990 | Bailey et al. | 318/762 |
| 4,926,354 | 5/1990 | Pattantyus | 363/98 |
| 5,170,105 | 12/1992 | Kumar | 318/362 |
| 5,243,522 | 9/1993 | Salzmann | 364/424.1 |
| 5,245,524 | 9/1993 | Nakagawa et al. | 363/62 |
| 5,412,268 | 5/1995 | Arnaud et al. | 318/139 |
| 5,473,227 | 12/1995 | Arnaud et al. | 318/139 |
| 5,572,099 | 11/1996 | Carobolante | 318/434 |

*Primary Examiner*—Paul Ip
*Attorney, Agent, or Firm*—Kenneth M. Massaroni

[57] ABSTRACT

In a circuit having an electromechanical transducer, such as a motor (22), a control switch (24) is controlled by a control circuit (26) to connect the motor to, and disconnect from, a battery (12). When control switch opens, thereby disconnecting the motor from the battery, the momentum achieved by the motor tends keep the motor turning, causing the motor to behave like a generator. A switch network (28) connects a first capacitor (30), which is initially discharged, across the motor at the same time the control switch disconnects it from the battery. The momentum of the motor, and any attached mechanical system (32), generates a transient charge which is collected by the first capacitor. When the voltage produced by the collected charge reaches a peak, the switch network disconnects the first capacitor from the motor, reorients the first capacitor, and waits to apply the voltage to the motor. A charge pump connected between the first capacitor and the battery may be activated to transfer the collected charge back to the battery if the motor is not to be started for some time.

15 Claims, 1 Drawing Sheet

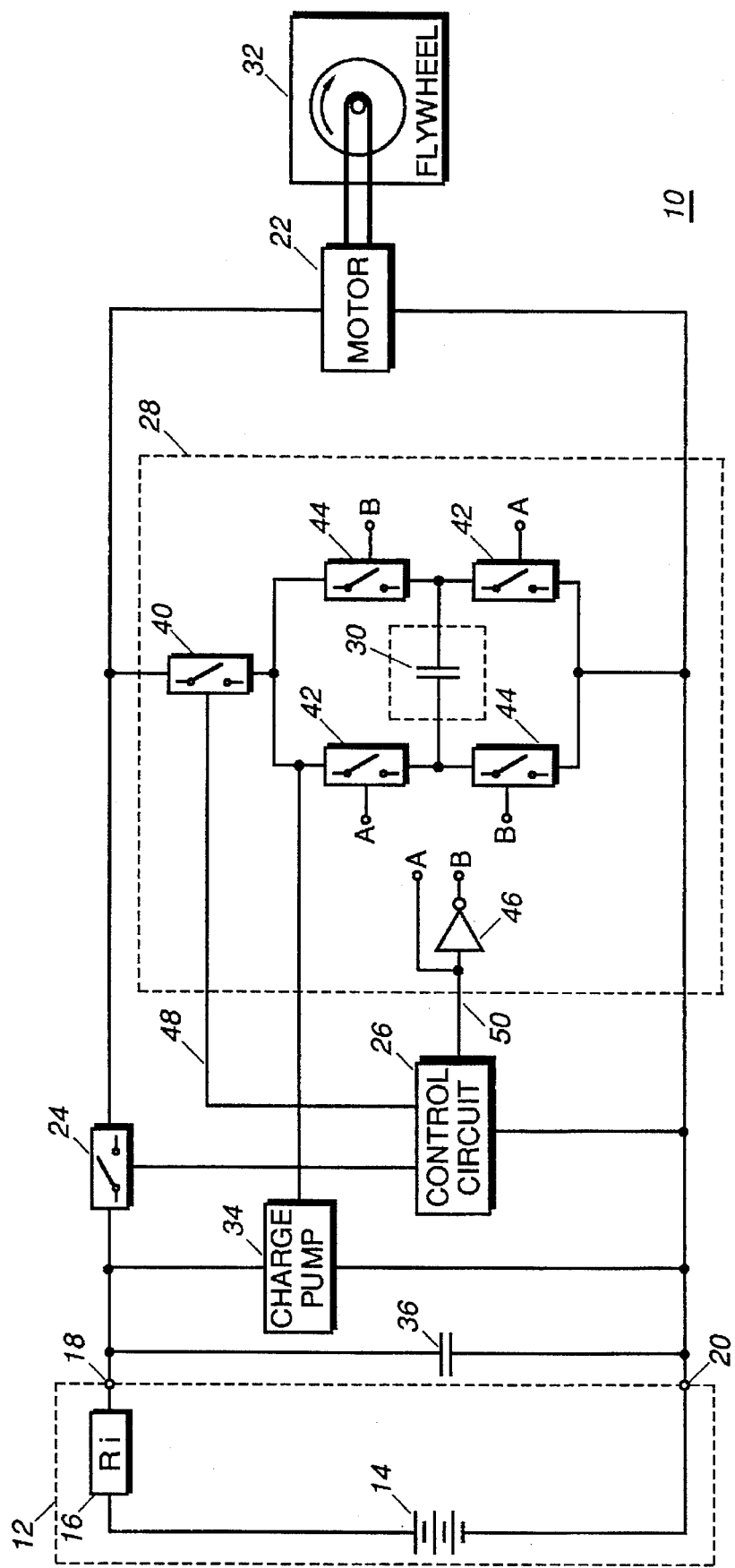

TRANSIENT CHARGE RECOVERY CIRCUIT

TECHNICAL FIELD

This invention relates in general to portable, or hand held battery powered devices, and particularly to circuits for handling voltage transients of electromechanical components in such devices.

BACKGROUND

In the manufacture of portable battery powered devices, operation time is a critical factor affecting marketability. Devices are routinely compared to competing devices on the basis of how long a given battery allows a user to operate the device. As a result, great efforts have been undertaken to reduce to power consumption of such devices. These efforts have produced a substantial body of technology for increasing the efficiency of battery powered devices.

Among the areas of primary concern are operating voltage, switching speed, regulator efficiency, and leakage current in semiconductors. For example, it had been a standard for some time that semiconductor logic devices operated at a 5 volt level. Routinely, however, manufacturers are instead preferring 3 volt, and in many cases 1 volt, logic systems. Lower voltage reduces the power dissipation and the effect of voltage induced leakage current. The logic systems depend on transistors to switch from one logic level to another. These switching transistors draw virtually negligible amounts of current when switched from one logic level to another. However, many components, such as microprocessors, have millions of such switching transistors, and they are operated in a way such that many of them may be making millions of transitions per second. The cumulative effect of these transitions results in a substantial current flow through these components. The focus on switching speed and efficiency has reduced the current drain for these components.

While these efforts have reduced the power required from the battery, electric energy recovery has, in comparison, been neglected in portable devices. For the most part this is justified. Reducing the power used by a device reduces the amount of energy that could be recovered, and in addition, since most of the electric energy is converted to heat, it is thermodynamically impossible, or at least very impractical, to recover. Still, some opportunity exists in certain devices.

Many of these devices include motors. Examples include cordless power tools, portable computers, and CD players. A control circuit controls operation of the motor by opening and closing a control switch connected between the motor and the battery. If motor speed is to be regulated, then a current and/or voltage regulator circuit is also placed in series with the control switch. However, when the motor is turned off, the momentum of the motor tends to keep the motor rotating, and causes the motor to generate a transient charge. In addition, the inductive windings of the motor are energized at the time the control switch is opened, and this energy must be released before the current through the windings can cease. The voltage generated by the transient has the opposite polarity of that applied to the motor to make it spin. When a charged inductive element, like a motor winding, is abruptly disconnected from a power source, a very large negative voltage transient is generated to dissipate the energy stored therein. As is well known in mechanical switch systems, this transient event can produce an arc between the switch contacts. In the case of a motor system having kinetic energy, the transient is both slightly larger and prolonged.

Transients can easily damage a semiconductor circuit in the absence of safeguards. For example, a transistor, used to control motor activation, which is connected directly to the motor is susceptible to damage from a transient event. The typical method of dealing with them is to place a capacitor paralleled with a resistor, and both in series with a diode, across the motor. This circuit is well known and widely used in the art, and is commonly referred to as a snubber circuit. This acts to cushion the electrical shock, and limit the negative voltage level experienced during a transient event. However, this simply results in converting electric energy to heat by dissipating energy through the resistor. It does not provide for reuse of the generated charge, which could be of benefit in a portable device since there is a finite amount of charge available from the battery.

Therefore there exists a need for a circuit in a portable battery powered device for handling transient charge generation, and there exists a need for reusing that charge.

BRIEF DESCRIPTION OF THE DRAWING

The FIGURE is a block diagram of a transient charge recovery circuit in accordance with the instant invention.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward.

Referring now to the figure, there is illustrated therein a block diagram of a transient charge recovery circuit 10 for use in a portable device in accordance with the instant invention. The device could be, for example, a compact disc (CD) player, computer hard drive disk, power tool such as a cordless drill, etc. Other devices which may benefit from a circuit in accordance with the invention would be a pager or a cellular phone having a motor for creating vibrations.

Operation time is often a key market feature with these devices. In general, the device is powered by a battery, or battery pack 12 comprising at least one battery cell 14. The battery cell or cells 14 have an intrinsic resistance 16, represented by $R_i$. The battery supplies power through positive terminal 18 and negative terminal 20. The battery is connected to a motor 22 through a control switch 24. The motor 22 is turned on and off by opening and closing the control switch 24, which is responsive to a control circuit 26. The control circuit preferably comprises a microprocessor, and since many portable devices already use a microprocessor, the control software is all that needs to be added in many cases. The control switch could be, for example, a MOSFET, or similar semiconductor switch. A switch network 28, also responsive to the control circuit, is used to connect a first capacitor 30 across the motor at an appropriate time, as described hereinbelow, and may also comprise MOSFETs or similar semiconductor switches. Initially, the first capacitor has no electrical charge stored therein.

When turning on the motor 22, the control circuit 26 closes the control switch 24, thereby connecting the motor across the battery. It will be appreciated by those skilled in the art that when the motor speed is to be precisely controlled, a controllable regulator will be provided between the battery and the motor. Once the control switch is closed, current flows from the battery through the motor, causing the motor to rotate and achieve momentum. The motor may be connected to mechanical assembly which acts as a flywheel 32. Energy is stored by the mechanical system in the kinetic energy achieved by the system, i.e., in the motion of the mechanical components, and in the motor winding. The abrupt disconnect of the motor from the battery causes the generation of a charge transient, resulting in a negative voltage spike.

To handle the negative transient, the control circuit activates the switch network when the control switch opens. This results in disconnecting the motor from the battery and connecting the first capacitor across the motor. Since the first capacitor initially has no stored electric charge, it begins achieving a negative voltage according to the formula $V=q/C$, where V is voltage, q is electric charge in coulombs, and C is the value of the capacitor in farads. As the motor, now a generator, generates charge, it's energy level reduces and the motor slows down. The first capacitor stores charge while the negative voltage increases. At some point the negative voltage across the first capacitor will achieve a maximum level. When the control circuit detects this, it disconnects the first capacitor from across the motor by means of the switch network. If the charge level in the first capacitor begins decreasing, it means that the collected charge is flowing back to the motor, and the motor is turning in the opposite direction.

The switch network is such that the capacitor orientation with respect to the terminals of the motor can be reversed. That is, once the negative voltage across the first capacitor has reached a peak level, the first capacitor can be disconnected from the circuit. The next time the motor needs to be started, the switch network can connect the first capacitor across the motor in the opposite orientation. That is, the terminals of the capacitor are reversed so that what was captured as a negative voltage, with respect to the battery, is disconnected, reoriented, and reconnected such that it is a positive voltage with respect to the battery. This provides recapture of some of the kinetic energy stored by the mechanical system when it is shut off so that it can be used later to start the motor moving before the battery is connected to the motor, thereby reducing the amount of charge drawn from the battery.

The simplest switch network configuration consists of a switch bridge having four switches arranged in two pairs. One pair connected to each terminal of the first capacitor, one of the pair connected to one terminal of the motor, the second of the pair connected to the other terminal of the motor. In the instant invention, it is contemplated that a fifth switch be used to connect one of the pair to one of the terminals of the motor so that the first capacitor can be disconnected altogether. The switch network will be described in further detail hereinbelow.

It is not always the case that the motor will be restarted shortly after is stopped, as when the device is shut off by the user. Since the first capacitor is likely to have a significantly more leakage current than the battery, it would be useful to recover as much of the stored charge as possible. To recover the charge stored in the first capacitor, the control circuit activates a charge pump circuit 34, which is connected between the first capacitor and the positive terminal 18 of the battery 12. Charge is then transferred from the first capacitor 30 to the battery 12. Various types of charge pump circuits exist in the art, examples of which include switched capacitor banks and inductive flyback circuits.

To further enhance the circuit under some conditions, a second capacitor 36 may be included. The second capacitor 36 functions to reduce resistive losses from the battery 12 through its intrinsic resistance 16. Under step load conditions the voltage output from the battery can drop significantly because of the series intrinsic resistance. Conditions like this occur when turning on a motor, for example, when the parasitic capacitance of the motor windings become charged, but more likely in pulsed current systems such as, for example, digital cellular telephones which use a regular current pulse train during operation. The second capacitor supplements the pulse or step current sourcing capability of the battery under such circumstances. In addition, if the charge pump circuit is activated, the battery may receive high level current pulses. The second capacitor will act to absorb a majority of the charge these pulses provide, instead of dissipating energy across the intrinsic resistance of the battery.

An exemplary switch network 28 includes a disconnect switch 40, a first pair of complementary switches 42 having an input A, a second pair of complementary switches 44 having an input B, and an inverter 46. This arrangement is referred to as a switch bridge, and the first capacitor 30 is said to be connected across the bridge. There is also a first control line 48 and a second control line 50, both of which are connected to the control circuit. The first control line carries a signal from the control circuit to the disconnect switch, thereby allowing the control circuit to connect or disconnect the switch network across the motor 22. The second control line carries a signal from the control circuit that determines the orientation of the first capacitor 30 with respect to the motor 22. it does this by splitting the signal into complementary parts with inverter 46. The signal on the second control line is given designation A, and the inverse of A is designated as B, which evident at the output of the inverter. Each of these signals are coupled to the corresponding inputs of the complementary switch pairs. When signal A is at an active level, the first pair of complementary switches 42 are closed, and the second pair 44 is open, providing a first orientation of the first capacitor. When signal A drops to an inactive level, signal B becomes active, and the second pair of complementary switches 44 close, and the first pair 42 open, providing a second orientation of the first capacitor.

With this switch network, the first capacitor can be charged in the first orientation, then reoriented by changing the signal level on the second control line. This type of switch network is known in the art, and referred to as a switch bridge. The disconnect switch is closed while the negative transient charge is being collected, then opened once the charge level reaches a peak level. The capacitor is then reoriented by switching the active complementary switch pair. When the motor needs to be started again, the disconnect switch is closed, and the voltage stored on the first capacitor starts the motor rotating. Once a substantial majority of the charge has been passed through the motor, and the voltage across the first capacitor has reached a very low level, the disconnect switch is opened, and at the same time, or shortly thereafter, the control switch is closed to apply battery power to the started motor.

If the motor is not going to be turned on for some time, the typical leakage current of a capacitor will cause the charge stored therein to decrease with time. Accordingly, it would be beneficial to transfer the stored charge back to the battery where it can be stored for a longer period. This is accomplished by the charge pump, as previously described. The charge pump connects to the first capacitor between the disconnect switch 40 and the complementary switch pairs through line 52.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A transient charge recovery circuit for a portable device powered by a battery and having a motor, said motor achieving momentum when connected to said battery and generating a transient charge when disconnected from said battery in response to said momentum, said transient charge recovery circuit comprising:

a control circuit;

a control switch responsive to said control circuit and electrically connected between said motor and said battery;

a first capacitor; and a switch network, comprising a disconnect switch responsive to a first control signal, a switch bridge, responsive to a second control signal, connected in series with said disconnect switch across said motor and wherein said first capacitor is connected across said switch bridge, said switch network responsive to said control circuit, for connecting said first capacitor across said motor to capture said transient charge, thereby producing a voltage across said first capacitor, disconnecting said first capacitor from said motor, and reorienting said first capacitor so that said voltage can be applied to said motor.

2. The transient charge recovery circuit as defined in claim 1, further comprising a charge pump, responsive to said control circuit, for transferring charge from said first capacitor to said battery.

3. The transient charge recovery circuit as defined in claim 1, wherein said first capacitor is an electrochemical capacitor.

4. The transient charge recovery circuit as defined in claim 1, wherein said control circuit comprises a microprocessor.

5. The transient charge recovery circuit as defined in claim 1, wherein said control switch is a semiconductor switch.

6. The transient charge recovery circuit as defined in claim 6, wherein said semiconductor switch is a MOSFET.

7. The transient charge recovery circuit as defined in claim 1, wherein said portable device is a pager having a motor for creating vibrations.

8. The transient charge recovery circuit as defined in claim 1, wherein said portable device is a cellular phone having a motor for creating vibrations.

9. The transient charge recovery circuit as defined in claim 1, further comprising a second capacitor connected across said battery.

10. The transient charge recovery circuit as defined in claim 9, wherein said second capacitor is an electrochemical capacitor.

11. A portable device, comprising:

a battery;

a motor, said motor achieving momentum when connected to said battery and generating an electrical charge when disconnected from said battery in response to said momentum;

a control circuit comprising a microprocessor;

a control switch responsive to said control circuit and electrically connected between said motor and said battery;

a first capacitor; and a switch network, comprising a disconnect switch, responsive to a first control signal, a switch bridge, responsive to a second control signal, connected in series with said disconnect switch across said motor and wherein said first capacitor is connected across said switch bridge, said switch network responsive to said control circuit, for connecting said first capacitor across said motor to capture said transient charge, thereby producing a voltage across said first capacitor, disconnecting said first capacitor from said motor, and reorienting said first capacitor so that said voltage can be applied to said motor.

12. The portable device as defined in claim 11, further comprising a charge pump, responsive to said control circuit, coupled between said first capacitor and said battery for transferring said electrical charge from said first capacitor to said battery.

13. The portable device as defined in claim 11, wherein said first capacitor is an electrochemical capacitor.

14. The portable device as defined in claim 11, wherein said control switch is a semiconductor switch.

15. The portable device as defined in claim 13, wherein said semiconductor switch is a MOSFET.

* * * * *